United States Patent [19]
Vitunic

[11] Patent Number: 5,546,017
[45] Date of Patent: Aug. 13, 1996

[54] HOT INSERTABLE ACTIVE SCSI TERMINATOR

[75] Inventor: Mark R. Vitunic, San Jose, Calif.

[73] Assignee: Micro Linear Corporation, San Jose, Calif.

[21] Appl. No.: 409,496

[22] Filed: Mar. 23, 1995

[51] Int. Cl.⁶ .............................................. H03K 19/0185
[52] U.S. Cl. .......................... 326/30; 327/310; 333/22 R
[58] Field of Search .................................. 326/21, 30, 62; 327/309, 310, 318, 312, 321, 538, 540, 541, 543; 333/22 R; 379/394, 398

[56] References Cited

U.S. PATENT DOCUMENTS

| | | | |
|---|---|---|---|
| 4,345,171 | 8/1982 | Harris, Jr. | 326/30 |
| 4,450,370 | 5/1984 | Davis | 326/30 |
| 4,943,739 | 7/1990 | Slaughter | 326/30 |
| 5,136,187 | 8/1992 | Ceccherelli et al. | 326/30 |
| 5,166,957 | 11/1992 | Lenoir | 375/36 |
| 5,220,211 | 6/1993 | Christopher et al. | 326/30 |
| 5,338,979 | 8/1994 | Mammano et al. | 326/30 |
| 5,341,039 | 8/1994 | Fukumoto | 326/30 |
| 5,357,156 | 10/1994 | Herrington | 327/309 |
| 5,381,034 | 1/1995 | Thrower et al. | 257/530 |
| 5,382,841 | 1/1995 | Feldbaumer | 326/30 |

OTHER PUBLICATIONS

Texas Instruments Inc., "TL2218–285 Excalibur SCSI Terminator," Advance Information Document, Draft #3, Jun. 16, 1992.

Ram Goealan, Mark Vitunic, "An Optimized Active SCSI Termination Technique," Silicon Valley Personal Computer Design Conference, Jul. 20–22, 1993, vol. II, pp. 339–344.

IBM Technical Disclosure Bulletin, "3–Mode Small Computer System Interface Terminator," vol. 37, No. 11, Nov. 1994.

Alan B. Grebene, *Bipolar and MOS Analog Integrated Circuit Design*, John Wiley & Sons, 1984, pp. 556–591.

Primary Examiner—Edward P. Westin
Assistant Examiner—Benjamin D. Driscoll
Attorney, Agent, or Firm—Haverstock & Associates

[57] ABSTRACT

The invention is an active, hot insertable, SCSI terminator circuit having a bypass device that permits an initially unpowered active SCSI terminator to be coupled to a signal line of a powered SCSI bus such that no damage results to the SCSI terminator circuit itself or to other SCSI devices on the SCSI bus, and without having the effect of altering the existing state of the SCSI bus as a result of the coupling. Preferably, the terminating element of the SCSI terminator is a p-channel MOSFET. The SCSI terminator is prevented from being damaged during the coupling by using the bypass device to effectively short the gate of the p-channel MOSFET terminating element to its drain. When the drain of the p-channel MOSFET terminating element is shorted to its gate the amount of current the SCSI terminator may draw from any and all SCSI signal lines during the coupling is substantially limited to less than 50 µA. The bypass device performs the shorting function until a SCSI terminator reference voltage powers up to its steady state value, after which the bypass device is disabled.

20 Claims, 4 Drawing Sheets

Terminating/Bypass Circuit

**Figure 1
Terminator I-V Characteristics**

Figure 2
(Prior Art)

Figure 3
Terminating/Bypass Circuit

Figure 4

HOT INSERTABLE ACTIVE SCSI TERMINATOR

FIELD OF THE INVENTION

This invention relates to Small Computer Systems Interface (SCSI) terminators. More specifically, this invention relates to SCSI terminators having means for inserting a SCSI device into a SCSI bus while the SCSI bus is powered.

BACKGROUND OF THE INVENTION

Passive termination methods for a Small Computer Systems Interface (SCSI) have traditionally provided reliable operation at low data transfer rates. At higher data transfer rates, however, transmission line effects become troublesome and passive terminators do not adequately compensate for impedance mismatches. Voltage reflections due to an impedance mismatch between a SCSI terminator and a transmission line are detrimental to overall noise immunity of the system and become increasingly troublesome the higher data transfer rates become. Also, at higher data transfer rates, the rising or falling edge of a signal can have a duration that comprises a significant portion of the signal duty cycle. This imposes tighter system timing constraints.

Figure 1:
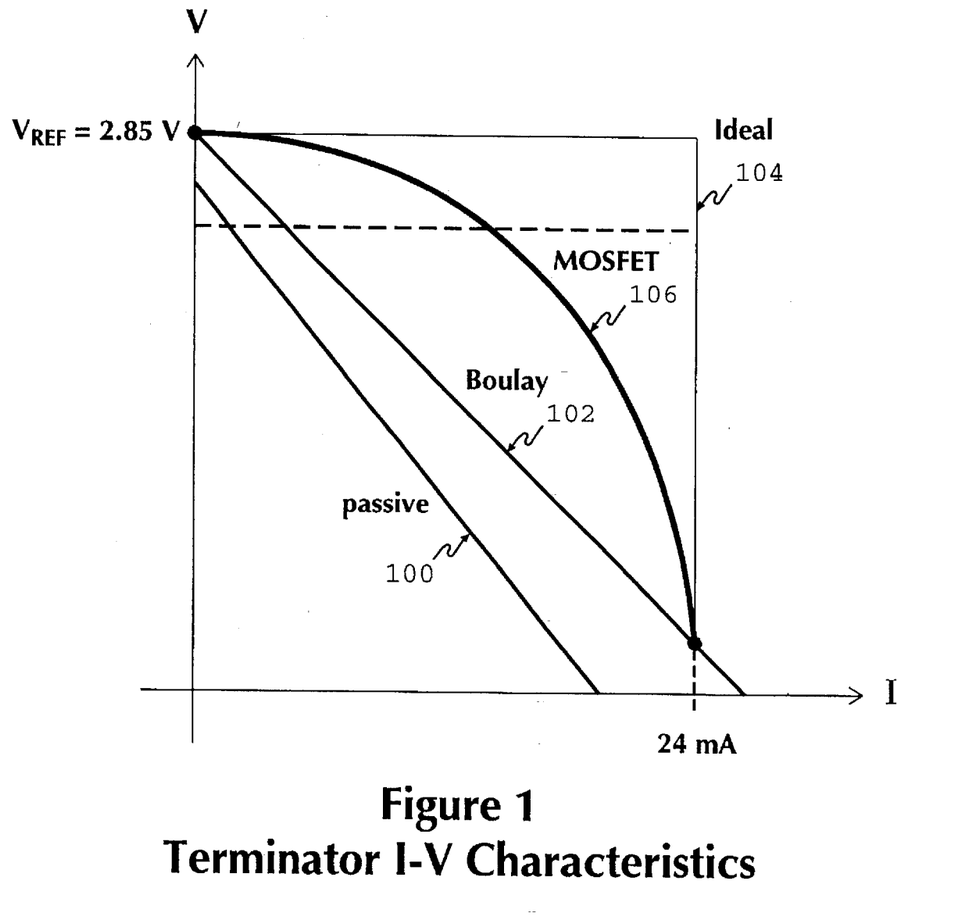
FIG. 1 shows representative I-V characteristics of a passive terminator, a Boulay terminator, an "ideal" current source, and an active (MOSFET) terminator.

Another drawback associated with the use of passive terminators involves wasted power. Because a DC path to ground always exists in a passive terminator, the passive terminator continuously dissipates power, even when the signal line is inactive. Additionally, since the passive terminator Thévenin voltage is unregulated, the noise immunity of the system is compromised and the maximum limit of source current specified by the SCSI standard is impinged upon. FIG. 1 shows a passive terminator I-V characteristic 100.

Boulay terminators that utilize an active voltage regulator to maintain a constant voltage at one terminal of a 110Ω resistor, where the other resistor terminal couples to the line, are known in the art. Because the Thévenin voltage is regulated, the output current is essentially immune to bias supply variations. Consequently, increased noise immunity is achieved as compared to passive terminators. The average power dissipation of the Boulay terminator is less than the power dissipated in a passive terminator, since the only power dissipated in the Boulay terminator is produced by the current required to power the regulator.

Although the Boulay terminator improves noise immunity and reduces power dissipation of a SCSI terminator, it does not address the timing issues associated with the rising or falling edge rates of a signal due to line and other parasitic capacitances. If the rising or falling edge duration becomes comparable in duration to the signal duty cycle and there exists ringing on the transient edge because of impedance mismatches, erroneous sampling may result. FIG. 1 shows a Boulay terminator I-V characteristic 102.

An active element in the termination path between the regulated voltage reference and the SCSI line provides a means for decreasing the transient time after a low-to-high transition as compared to what can be obtained using a passive element. While this may adversely affect transient performance after a high-to-low transition as compared to what can be obtained using a passive element, the trade-off is a good one as the transient performance after a low-to-high transition is more important than transient performance after a high-to-low transition because clock signals are positive edge triggered. Referring to FIG. 1, simulations suggest that Boulay I-V characteristics 102 are desirable for signal line assertions (high-to-low transitions) and "ideal" current source I-V characteristics 104 are desirable for signal line negations (low-to-high transitions). This implies that an optimum terminator I-V characteristic falls somewhere in between these two I-V characteristics. By using a MOSFET as an active element to replace the 110Ω resistor of the Boulay-type terminator, together with an amplifier configured with feedback architecture, a customizable I-V characteristic 106 can be achieved. Such an active SCSI termination technique is described in U.S. patent application Ser. No. 08/267,119, filed on Jun. 27, 1994.

Figure 2:
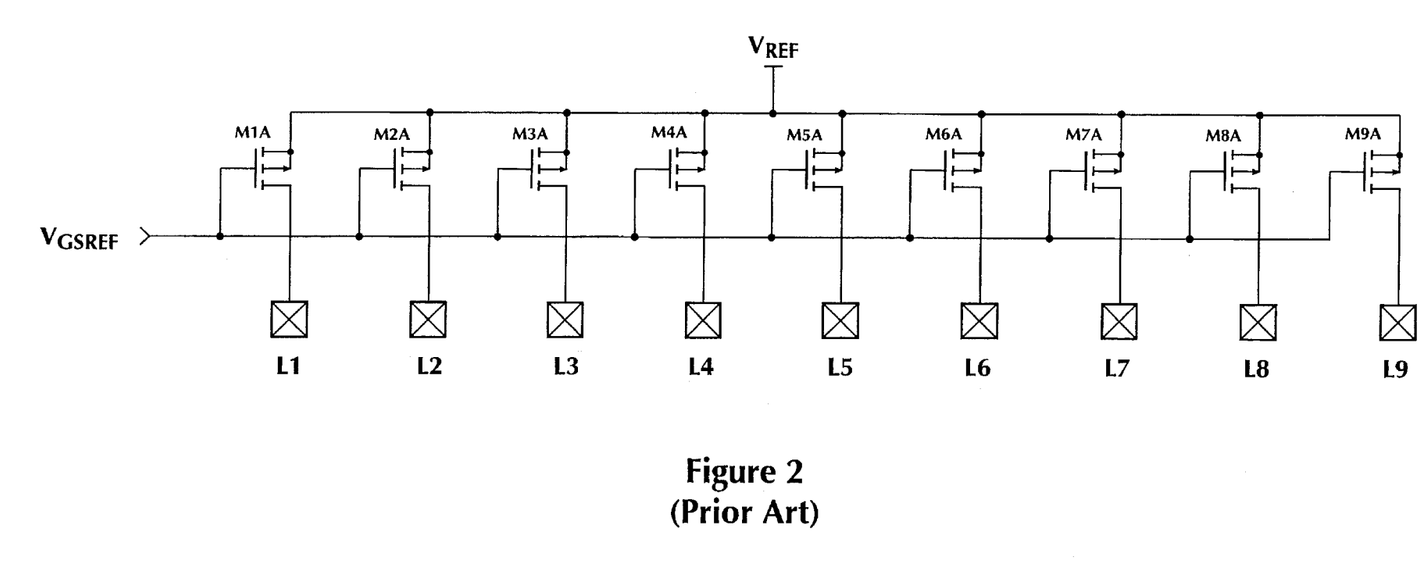
FIG. 2 shows a terminating portion of a prior art active SCSI termination circuit without hot insertion protection.

An active SCSI termination circuit is illustrated in FIG. 2. The active termination circuit provides a means for achieving an optimum terminator I-V characteristic, however, it does not provide means for safely accomplishing a "hot insertion." Therefore an object of the present invention is to provide a hot insertable SCSI terminator having an optimum I-V characteristic.

Hot insertion of a SCSI device refers to the act of coupling a SCSI device, which is initially unpowered, to a powered SCSI bus. It is important to prevent the inserted device from drawing excessive currents during a hot insertion. Excessive currents are currents that may cause device damage or threaten data integrity. This is true not only to protect the inserted device from damage, but also to insure that other devices already coupled to the SCSI bus are not damaged and to ensure that the data integrity on the SCSI bus is not compromised.

Immediately following a hot insertion, the potential at the reference node of the terminating circuit, VREF in FIG. 2, is zero. A finite time period is subsequently required before the circuitry that generates VREF (a voltage regulator powered by a power line from the SCSI bus, TERMPWR) establishes a constant, steady state reference voltage of approximately 2.85 volts at VREF.

During a hot insertion, a SCSI device and/or its associated terminating circuit may be damaged if the prior art terminating scheme shown in FIG. 2 is utilized. For example, if a SCSI device having an active terminator, as shown in FIG. 2, were hot inserted into a SCSI bus, and a signal line (i.e. one of L1 through L9) was in a high state when the insertion took place, a large transient current could flow through the terminating MOSFET associated with that line since the MOSFET source, which is coupled to the reference node, VREF, is initially at ground potential. This current may be large enough to damage the terminating MOSFET or even the SCSI device itself. Thus, hot insertion of a SCSI device without transient power up protection can be deleterious to both the inserted device and the system.

Hot insertion in the absence of transient power up protection may also lead to a compromise of integrity of data on the SCSI bus. For example, if L1 is high and L2 is low immediately following a hot insertion, the potentially large current drawn from the L1 line during the power up transient might flow into the L2 line, disrupting the high state of L1 and/or the low state of L2, and possibly leading to a data error on the SCSI signal lines.

For these reasons, the use of the termination circuit of FIG. 2 requires the user to power down the system before a SCSI device may be safely coupled to a SCSI bus. In other words, because the SCSI terminator of FIG. 2 does not provide any protection against excessive line currents during the power up transient and does not provide means for protecting the data integrity of the SCSI bus during the power up transient, it cannot be reliably used to terminate a device that may be hot inserted into the SCSI bus.

3

The precautionary system power-down step in the SCSI device insertion procedure described above may be cumbersome and time consuming or may be inadvertently skipped. Therefore, what is needed is an active SCSI termination circuit capable of coupling to a SCSI bus while the SCSI bus is powered and while the SCSI device to be inserted is not powered. In other words, what is needed is an active SCSI termination circuit capable of being hot inserted into a SCSI bus, that provides transient protection to the inserted device and to the SCSI system until the reference voltage, VREF, at the reference node of the SCSI terminator, has powered up to its steady state value.

SUMMARY OF THE INVENTION

Figure 3:
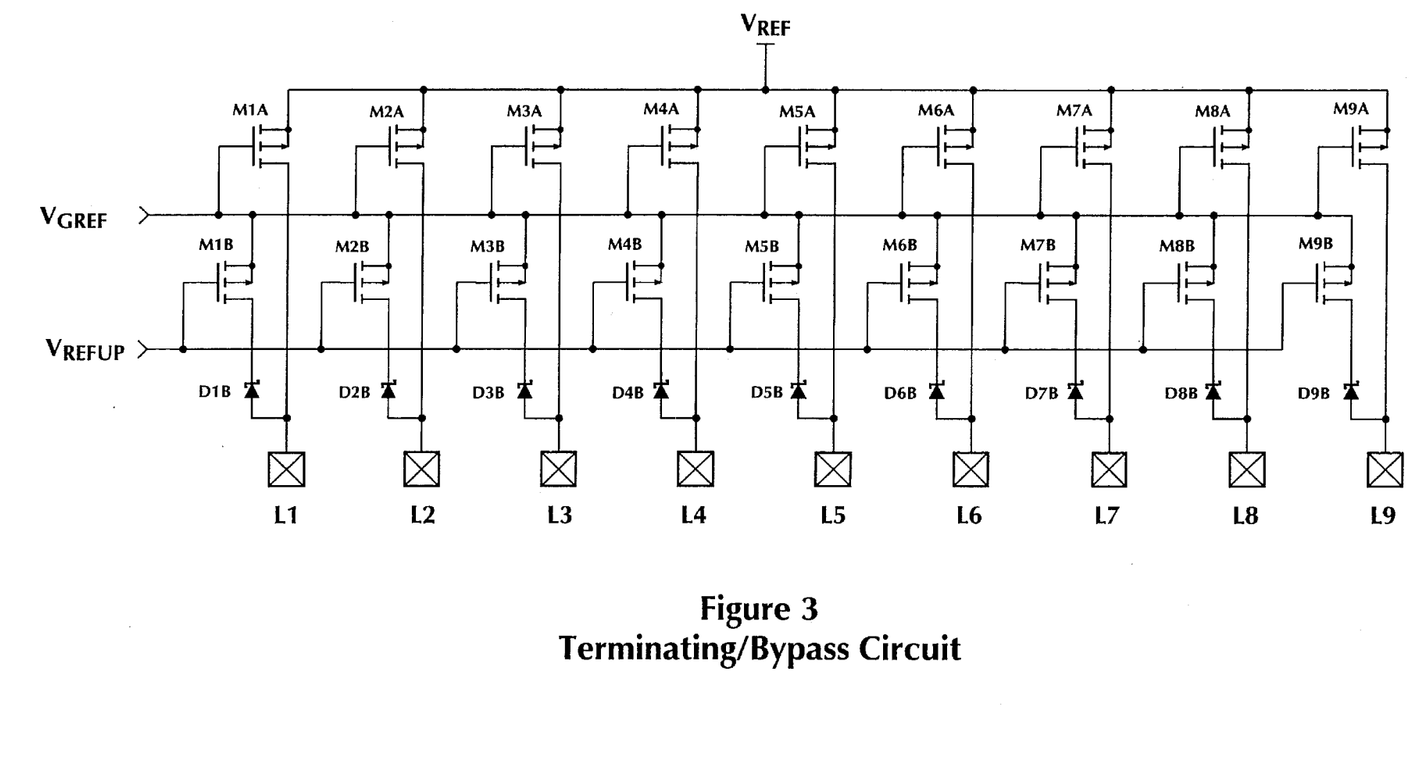
FIG. 3 is a schematic diagram of the preferred embodiment of the terminating portion of the present invention showing the bypass devices that provide means for hot insertion protection.

The present invention is a hot insertable, active SCSI terminator. A SCSI device is configured to communicate via a SCSI bus. The SCSI device includes a SCSI terminator which can be coupled to a powered SCSI bus. Immediately following a coupling of the SCSI terminator to the SCSI bus, and until the SCSI terminator has powered up, a bypass device prevents the terminator from drawing excessive current from the SCSI bus or delivering excessive current to the SCSI bus. The bypass device comprises a p-channel MOSFET in series with a Schottky diode (i.e. M1B in series with D1B as shown in FIG. 3), to short the gate and drain of the associated p-channel MOSFET terminating element, (M1A in this example), for the period of time after the SCSI device is first hot inserted into the SCSI bus until VREF has powered up to its steady state value. The bypass device protects the inserted SCSI device by preventing the SCSI terminator from drawing more than 50 µA from any or all given output lines (L1 through L9 shown in FIG. 3) during a hot insertion. The bypass device thus provides a protectionary function whereby a hot inserted SCSI device is prevented from being damaged. Because the invention prevents the drawing of excessive currents from the output lines during power up, the invention also insures that the integrity of data on the SCSI signal lines of the SCSI bus is not compromised.

The invention also provides a disabling circuit comprised of active elements which, when activated, effectively removes the SCSI terminator from the SCSI bus. When the SCSI terminator circuit is disabled, it will neither source nor sink a current in excess of 100 µA from TERMPWR.

DETAILED DESCRIPTION OF THE PREFERRED EMBODIMENT

Figure 4:
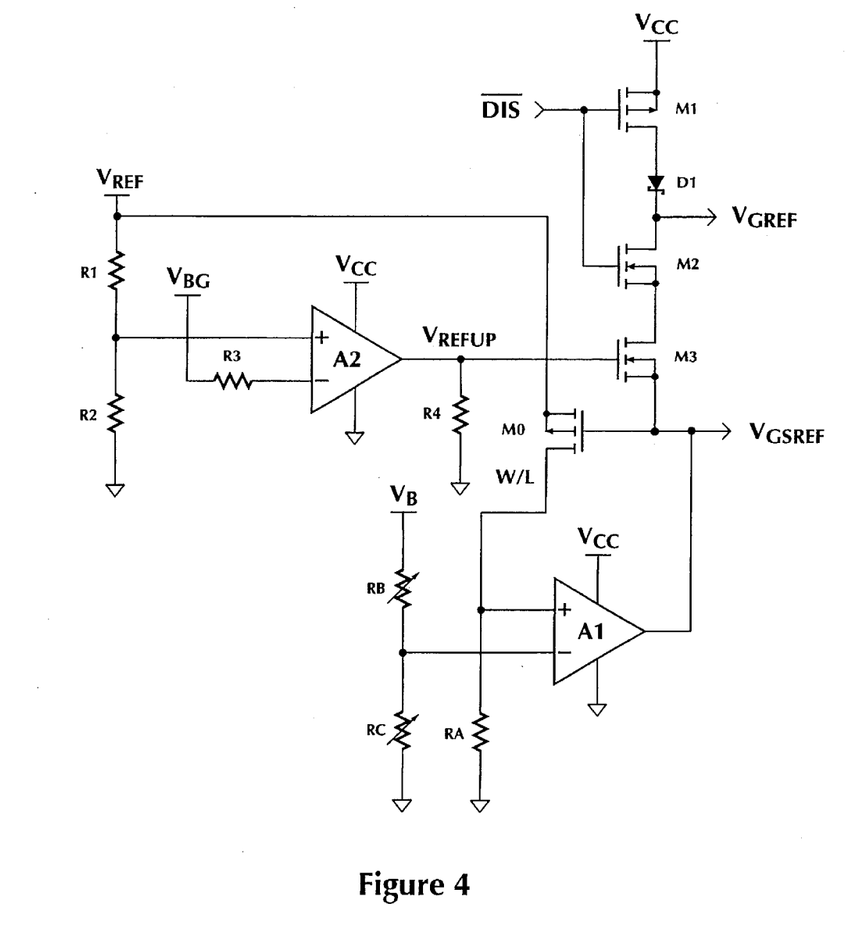
FIG. 4 shows a schematic diagram of the preferred embodiment of the control and comparator portion of the present invention.

FIG. 3 and FIG. 4 show schematic diagrams which together depict the preferred embodiment of the present invention. VREF is a reference node that is coupled to a power line of a SCSI bus, TERMPWR, when a SCSI device is inserted into the SCSI bus; VCC is a constant voltage supply; VB is a constant voltage reference input to set a DC bias voltage; and VBG is an internal bandgap reference voltage.

Referring to FIG. 4, R1 is a resistor having a first terminal and a second terminal; R2 is a resistor having a first terminal and a second terminal; R3 is a resistor having a first terminal and a second terminal; and R4 is a resistor having a first terminal and a second terminal. A2 is a comparator having a noninverting input, an inverting input and an output. The first terminal of R1 is coupled to VREF and the second terminal of R1 is coupled to the noninverting input of a A2. The first terminal of R2 is coupled to the noninverting input of A2 and the second terminal of R2 is coupled to ground. The first terminal of R3 is coupled to the inverting input of A2 and the second terminal of R3 is coupled to VBG. The first terminal of R4 is coupled to the output of A2 and the second terminal of R4 is coupled to ground.

RA is a resistor having a first terminal and a second terminal; RB is a variable resistor having a first terminal and a second terminal; and RC is a variable resistor having a first terminal and a second terminal. A1 is an operational amplifier having a noninverting input, an inverting input and an output. The first terminal of RA is coupled to the noninverting input of A1 and the second terminal of RA is coupled to ground. The first terminal of RB is coupled to VB and the second terminal of RB is coupled to the inverting input of A1. The first terminal of RC is coupled to the inverting input of A1 and the second terminal of RC is coupled to ground.

M0 is a p-channel MOSFET having a source, a drain and a gate. The source of M0 is coupled to VREF; the drain of M0 is coupled to the noninverting input of A1; and the gate of M0 is coupled to the output of A1.

M2 and M3 are n-channel MOSFETs each having a source, a drain and a gate. The source of M2 is coupled to the drain of M3 and the gate of M2 is coupled to be controlled by a disabling input, $\overline{DIS}$. The source of M3 is coupled to the gate of M0 and the gate of M3 is coupled to the output of A2.

M1 is a p-channel MOSFET having a source, a drain and a gate. D1 is a Schottky diode having a cathode and an anode. The source of M1 is coupled to VCC; the drain of M1 is coupled to the anode of D1; and the gate of M1 is coupled to be controlled by the disabling input, $\overline{DIS}$. The cathode of D1 is coupled to the drain of M2.

Referring to FIG. 3, M1A, M2A, M3A, M4A, M5A, M6A, M7A, M8A, and M9A are p-channel MOSFETs each having a source, a drain and a gate and each having an aspect ratio approximately twenty-four times larger than the aspect ratio of M0 which is shown in FIG. 4. M1B, M2B, M3B, M4B, M5B, M6B, M7B, M8B, and M9B are p-channel MOSFETs each having a source, a drain and a gate. D1B, D2B, D3B, D4B, D5B, D6B, D7B, D8B, and D9B are Schottky diodes each having a cathode and an anode. L1, L2, L3, L4, L5, L6, L7, L8, and L9 are the output terminals which removably couple to the signal lines of the SCSI bus.

The sources of each of M1A, M2A, M3A, M4A, M5A, M6A, M7A, M8A, and M9A are coupled to VREF. The drain of M1A is coupled to L1; the drain of M2A is coupled to L2; the drain of M3A is coupled to L3; the drain of M4A is coupled to L4; the drain of M5A is coupled to L5; the drain of M6A is coupled to L6; the drain of M7A is coupled to L7; the drain of M8A is coupled to L8; and the drain of M9A is coupled to L9. The gate of each of M1A, M2A, M3A, M4A, M5A, M6A, M7A, M8A, and M9A is coupled to the cathode of D1, which is shown in FIG. 4.

The source of M1B is coupled to the gate of M1A; the source of M2B is coupled to the gate of M2A; the source of M3B is coupled to the gate of M3A; the source of M4B is coupled to the gate of M4A; the source of M5B is coupled to the gate of M5A; the source of M6B is coupled to the gate of M6A; the source of M7B is coupled to the gate of M7A; the source of M8B is coupled to the gate of M8A; and the source of M9B is coupled to the gate of M9A. The drain of M1B is coupled to the cathode of D1B; the drain of M2B is coupled to the cathode of D2B; the drain of M3B is coupled to the cathode of D3B; the drain of M4B is coupled to the cathode of D4B; the drain of M5B is coupled to the cathode of D5B; the drain of M6B is coupled to the cathode of D6B; the drain of M7B is coupled to the cathode of D7B; the drain of M8B is coupled to the cathode of D8B; and the drain of M9B is coupled to the cathode of D9B. The gates of each of M1B through M9B are coupled to each other and to the output of A2, which is shown in FIG. 4.

The anode of D1B is coupled to L1; the anode of D2B is coupled to L2; the anode of D3B is coupled to L3; the anode of D4B is coupled to L4; the anode of D5B is coupled to L5; the anode of D6B is coupled to L6; the anode of D7B is coupled to L7; the anode of D8B is coupled to L8; and the anode of D9B is coupled to L9.

FIG. 3 shows a circuit diagram of the terminating and bypass device portion of the present invention. M1A through M9A comprise the terminating elements of the SCSI terminator. M1B through M9B and D1B through D9B together comprise the bypass devices. L1 through L9 are the terminals of the SCSI terminator that couple to the SCSI bus.

FIG. 4 is a schematic diagram of the control/comparator circuit of the invention. The amplifier, A1, generates and controls a reference voltage, VGSREF, that biases the gates of the MOSFET terminating elements, M1A through M9A, which are shown in FIG. 3, via the series connection of M2 and M3. A reference MOSFET, M0, situated in the feedback path of A1, controls the operational characteristics of the MOSFET terminating elements, M1A through M9A; varying the W/L aspect ratio of the MOSFET terminating elements, M1A through M9A, while maintaining a constant ratio of the W/L of the MOSFET terminating elements, M1A through M9A, to a W/L of the reference MOSFET, M0, affects the "bow" of the I-V characteristic 106, shown in FIG. 1. The gate of M0 is coupled to each gate of the MOSFET terminating elements, M1A through M9A, via two n-channel MOSFETs, M2 and M3, that are normally on when the terminator is operating in a steady state (i.e. not during a hot insertion) and the termination circuit is not disabled (i.e. $\overline{DIS}$=1). The circuitry coupled to the inputs of A1 and the aspect ratio (W/L) of M0 are designed so that VGSREF biases M0 at a drain current of approximately ID(M0) =1 mA. Because the gates of the MOSFET terminating elements, M1A through M9A, are coupled to the gate of M0 via the relatively low impedance path of the series connection of M2 and M3 when M2 and M3 are both on, the drain currents of the MOSFET terminating elements, M1A through M9A, are related to the drain current of M0, ID(M0), through the multiplication factor of the aspect ratios of M0 and the MOSFET terminating elements, M1A through M9A. The multiplication factor in the preferred embodiment is designed to be 24, but may be lower or higher. Therefore, the terminating MOSFETs, M1A through M9A, will source a maximum current of 24 mA. This maximum current conforms to the specification set forth by SCSI-2 standards.

When a device is hot inserted into a SCSI bus, VREF is initially at ground level and must undergo a power up transition before it reaches its steady state value of 2.85 V. At the beginning of the power up transition, VREFUP (the output voltage level of the comparator, A2) is low and M1B through M9B are on. So, if one of the lines, for example L1, is active at the beginning of the power up transition, the Schottky diode of the bypass device that is associated with that line, D1B, becomes forward biased when the insertion takes place; since M1B is in series with D1B, the gate of the associated terminating MOSFET, M1A, is effectively shorted to its drain. The presence of the Schottky diodes as part of the bypass device also prevents the flow of current from one bypass device to another (i.e. current is prevented from flowing from the L1 bypass device, comprised of M1B and D1B, into the L2 bypass device, comprised of M2B and D2B, because of the presence of D2B). The bypass device effectively shorts the gate of each terminating MOSFET element, M1A through M9A, to its own drain so that each terminating MOSFET element draws a limited current from any given output line, L1 through L9, for the period beginning when the SCSI device is first hot inserted into the SCSI bus and ending when the SCSI device has powered up to its steady state value (i.e. during hot insertion). During a hot insertion, each terminating element no more than 50 μA, from any and all given output lines.

At some time during the power up transition, the voltage at the noninverting input of comparator A2 (determined by the Thévenin equivalent of VREF, R1 and R2) will exceed the bandgap reference voltage, VBG, at the inverting terminal of A2. When this event happens, the output of A2, VREFUP, switches to a high state, M3 turns on, and so long as $\overline{DIS}$ is high, M2 remains on. Under these conditions, VGREF (the bias at the gates of the MOSFET terminating elements, M1A-M9A) is pulled to VGSREF (~1 V) and the p-channel MOSFETs of the biasing circuit, M1B through M9B, are turned off. In other words, when VREF switches to a high state, the bypass devices are disabled and hot insertion is complete.

Note that when $\overline{DIS}$=0, the entire SCSI terminating circuit is disabled since M1 is on, D1 is forward biased and VGREF is high enough, relative to VREF, to turn off the terminating MOSFETs, M1A through M9A. The SCSI terminating circuit is therefore effectively removed from the SCSI bus when $\overline{DIS}$=0. Because the terminating MOSFETs, M1A through M9A, and the disabling circuit are comprised of active elements, the termination circuit can be activated and deactivated under software control, thus eliminating the need for end user intervention (i.e. the required manual insertion/removal of the terminator in resistive-terminating element SCSI terminators to activate/deactivate).

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent that to one of ordinary skill in the art that the device of the present invention could be implemented in several different ways and the apparatus disclosed above is only illustrative of the preferred embodiment of the invention and is in no way a limitation.

We claim:

1. A hot insertable SCSI terminator circuit capable of coupling to a SCSI signal line in a SCSI bus while the SCSI bus is powered, the terminator circuit comprising:

a. a reference node;

b. a signal line terminal;

c. a terminating element coupled between the reference node and the signal line terminal; and d. a bypass device coupled to the signal line terminal for substantially limiting a current the terminating element may draw from a SCSI signal line through the signal line terminal during the time the SCSI terminator circuit is first hot inserted into the SCSI bus until the reference node has powered up to a first predetermined voltage level.

2. The hot insertable SCSI terminator circuit according to claim 1 wherein the terminating element further comprises a first p-channel MOSFET having a first source, a first drain and a first gate wherein the first source is coupled to the reference voltage node, the first drain is coupled to the signal line terminal and the first gate is coupled to be controlled by a first control signal.

3. The hot insertable SCSI terminator circuit according to claim 2 wherein the bypass device comprises a second p-channel MOSFET having a second gate, a second source and a second drain and a Schottky diode having a cathode and an anode wherein the cathode is coupled to the second drain, the anode is coupled to both the signal line terminal and to the first drain, the second source is coupled to the first gate and wherein the second gate is coupled to be controlled by a second control signal.

4. The hot insertable SCSI terminator circuit according to claim 1 further comprising:

a. means for detecting when the reference node has powered up to the first predetermined voltage level coupled to the reference node; and b. means for disabling the bypass device after the reference node has powered up to the first predetermined voltage level coupled to the bypass device.

5. The hot insertable SCSI terminator circuit according to claim 4 wherein the means for detecting comprises a comparator having a noninverting input, an inverting input and an output wherein the noninverting input is coupled to the reference node and the inverting input is coupled to a second predetermined voltage level, wherein the output of the comparator is coupled to the means for disabling the bypass device and wherein the bypass device is disabled when the voltage at the noninverting input of the comparator exceeds the second predetermined voltage level.

6. The hot insertable SCSI terminator circuit according to claim 5 wherein the means for detecting further comprises a first resistor having a first terminal and a second terminal; a second resistor having a first terminal and a second terminal; a third resistor having a first terminal and a second terminal; and a fourth resistor having a first terminal and a second terminal wherein the first terminal of the first resistor is coupled to the noninverting input of the comparator; the second terminal of the first resistor is coupled to the reference node; the first terminal of the second resistor is coupled to the noninverting input of the comparator; the second terminal of the second resistor is coupled to ground; the first terminal of the third resistor is coupled to the inverting input of the comparator; the second terminal of the third resistor is coupled to the second predetermined voltage level; the first terminal of the fourth resistor is coupled to the output of the comparator; and the second terminal of the fourth resistor is coupled to ground.

7. An active, hot insertable SCSI termination circuit for receiving a digital signal at an output node from a peripheral device via a signal line, wherein the SCSI termination circuit includes a termination element coupled for providing more current to the output node in response to the digital signal than a corresponding linear terminator circuit and wherein the termination circuit comprises hot insertion means wherein the termination circuit may be coupled to the peripheral device while the termination circuit is in a condition of being powered on without the peripheral device drawing excessive transient current from the signal line.

8. The active, hot insertable SCSI termination circuit according to claim 7 wherein the transient current is excessive if the transient current exceeds 50 µA.

9. The active, hot insertable SCSI termination circuit according to claim 8 wherein the termination element is coupled to the signal line and wherein the means for hot insertion comprises a bypass device coupled to the signal line and to a control terminal of the termination element.

10. The active, hot insertable SCSI termination circuit according to claim 9 wherein the termination element comprises a first p-channel MOSFET having a first source, a first drain and a first gate wherein the first source is coupled to a reference voltage node, the first drain is coupled to the signal line and the first gate is coupled to be controlled by a first control signal and wherein the bypass device comprises a second p-channel MOSFET having a second source, a second drain and a second gate and a Schottky diode having a cathode and an anode wherein the cathode is coupled to the second drain, the anode is coupled to the signal line and to the first drain, the second source is coupled to the first gate and wherein the second gate is coupled to be controlled by a second control signal.

11. The active, hot insertable SCSI termination circuit according to claim 10 wherein the second control signal is coupled to means for detecting a voltage level at the reference voltage node wherein the control signal disables the bypass device when the voltage at the reference voltage node has powered up to a predetermined voltage level.

12. The active, hot insertable SCSI termination circuit according to claim 11 wherein the first control signal enables the termination element by coupling the signal line to the reference voltage node and disables the termination element by decoupling the signal line from the reference voltage node.

13. The active, hot insertable SCSI termination circuit according to claim 12 wherein the first control signal is controlled by a software program.

14. An active, hot insertable SCSI termination circuit coupled to receive a signal from a peripheral device via a signal line, wherein the termination circuit comprises:

a. a termination element coupled to the signal line;

b. means for controlling the termination element coupled to the termination element so as to control the termination element such that the relationship between a termination voltage and a termination current is characterized by a nonlinear and smooth voltage versus current curve plotted in the first quadrant of a Cartesian coordinate system and having a negative slope varying continuously from a first point having a first slope to a second point having a second slope wherein the coordinates of the first point comprise a maximum termination voltage and a minimum termination current and wherein the coordinates of the second point comprise a minimum termination voltage and a maximum termination current, such that the negative slope becomes increasingly and continuously more negative as the termination voltage decreases from the first point to the second point; and c. hot insertion means wherein the termination circuit may be coupled to the peripheral device while the termination circuit is in a condition of being powered on without the peripheral device drawing excessive transient current from the signal line and without the peripheral device delivering excessive transient current to the signal line.

15. The active, hot insertable SCSI termination circuit according to claim 14 wherein the transient current is excessive when the transient current exceeds 50 µA.

16. The active, hot insertable SCSI termination circuit according to claim 15 wherein the means for hot insertion comprises a bypass device coupled to the signal line terminal and to the control terminal of the termination element.

17. The active, hot insertable SCSI termination circuit according to claim 16 wherein the termination element comprises a first p-channel MOSFET having a first source, a first drain and a first gate wherein the first source is coupled to a reference voltage node, the first drain is coupled to the signal line and the first gate is coupled to be controlled by a first control signal and wherein the bypass device comprises a second p-channel MOSFET having a second source, a second drain and a second gate and a Schottky diode having a cathode and an anode wherein the cathode is coupled to the second drain, the anode is coupled to the signal line and the first drain, the second source is coupled to the first gate and wherein the second gate is coupled to be controlled by a second control signal.

18. The active, hot insertable SCSI termination circuit according to claim 17 wherein the second control signal is coupled to means for detecting a voltage level at the reference voltage node wherein the control signal disables the bypass device when the voltage at the reference voltage node has powered up to a predetermined voltage level.

19. The active, hot insertable SCSI termination circuit according to claim 18 wherein the first control signal enables the termination element by coupling the signal line to the reference voltage node and disables the termination element by decoupling the signal line from the reference voltage node.

20. The active, hot insertable SCSI termination circuit according to claim 19 wherein the first control signal is controlled by a software program.

* * * * *

UNITED STATES PATENT AND TRADEMARK OFFICE
CERTIFICATE OF CORRECTION

PATENT NO. : 5,546,017
DATED : August 13, 1996
INVENTOR(S) : Mark R. Vitunic

It is certified that error appears in the above-identified patent and that said Letters Patent is hereby corrected as shown below:

In column 4, line 62, "MSA" should have been typed --M5A--.

In column 6, line 33, "(⌣1 V)" should have been typed --(⌣1 V)--.

Signed and Sealed this

Nineteenth Day of November, 1996

Attest:

BRUCE LEHMAN

Attesting Officer     Commissioner of Patents and Trademarks